United States Patent
Elissen et al.

(10) Patent No.: US 7,981,291 B2
(45) Date of Patent: Jul. 19, 2011

(54) METHOD AND PLANT FOR THE TREATMENT OF AN AQUEOUS WASTE STREAM

(75) Inventors: Hellen J. H. Elissen, Randwijk (NL); Bastain R. Buys, Wageningen (NL); Wilhelmus H. Rulkens, Wageningen (NL); Bernard G. Temmink, Wageningen (NL)

(73) Assignee: Stichting Wetsus (NL)

( * ) Notice: Subject to any disclaimer, the term of this patent is extended or adjusted under 35 U.S.C. 154(b) by 289 days.

(21) Appl. No.: 11/920,409

(22) PCT Filed: May 15, 2006
(Under 37 CFR 1.47)

(86) PCT No.: PCT/NL2006/050115
§ 371 (c)(1),
(2), (4) Date: Mar. 10, 2009

(87) PCT Pub. No.: WO2007/040397
PCT Pub. Date: Apr. 12, 2007

(65) Prior Publication Data
US 2010/0140165 A1    Jun. 10, 2010

(30) Foreign Application Priority Data
May 13, 2005 (NL) .................................. 1029052

(51) Int. Cl.
*C02F 3/32* (2006.01)
(52) U.S. Cl. ...................................................... 210/602
(58) Field of Classification Search ............... 210/602, 210/620, 252, 259
See application file for complete search history.

(56) References Cited

U.S. PATENT DOCUMENTS
| | | | | |
|---|---|---|---|---|
| 3,635,816 A | * | 1/1972 | Golub | 210/602 |
| 6,517,723 B1 | * | 2/2003 | Daigger et al. | 210/605 |
| 2005/0006304 A1 | * | 1/2005 | Ames et al. | 210/602 |

FOREIGN PATENT DOCUMENTS
| | | | |
|---|---|---|---|
| EP | 0999194 A | | 5/2000 |
| IE | 960203 | | 9/1997 |
| JP | 01-206937 A | * | 8/1989 |
| WO | WO 2005016833 | | 2/2005 |

OTHER PUBLICATIONS
Martin, P. et al., "Global diversity of oligochaetous clitrllates (Oligochaeta; Clitellata) in freshwater," *Hydrobiologia* 595:117-127 (2008).

* cited by examiner

*Primary Examiner* — Fred Prince
(74) *Attorney, Agent, or Firm* — Medlen & Carroll, LLP

(57) ABSTRACT

The invention relates to a method for the treatment of an aqueous waste stream, wherein: (a) an aqueous waste stream is separated into an effluent and waste sludge; and (b) the waste sludge is converted into predated waste sludge in a predation reactor, the predation reactor including a support comprising worms and the waste sludge being fed past the support comprising worms. The invention further relates to an plant in which the method may be carried out, in particular to an plant for the treatment of an aqueous waste stream that comprises a predation reactor having a support comprising worms, wherein the predation reactor has two compartments that are separated by the support comprising worms.

10 Claims, 2 Drawing Sheets

METHOD AND PLANT FOR THE TREATMENT OF AN AQUEOUS WASTE STREAM

The present invention relates to a method and a plant for the treatment of an aqueous waste stream. The present invention relates more particularly to a method and a plant for reducing the mass of waste sludge that is produced during the treatment of waste water.

Industrial and domestic waste water is normally biologically treated with the aid of micro-organisms, wherein waste matter is converted into harmless products and at the same time consumed as a substrate. The micro-organisms form flocs which can be separated off, for example with the aid of a post-settling device, a flotation device or a membrane separation device.

During the treatment of waste water, the growth of the micro-organisms leads to the formation of an excessive amount of biomass. Excess sludge is also produced during pre-settling of the waste water and during fermentation of biological sewage treatment sludge. All these streams will be referred to in hereinafter as "waste sludge". Waste sludge per se is of little economic value. Waste sludge is usually thickened at the site of the sewage treatment plant and then transported to a fermentation plant. In the fermentation plant, a quantity of approximately 40% (based on dry matter) is converted into biogas, while the remainder is dewatered and subsequently removed to an incinerator. The processing and the transportation of waste sludge involve considerable costs which can amount to approximately half the waste water treatment costs. Moreover, the transportation results in a considerable emission of carbon dioxide.

In the prior art, it has been proposed to transform waste sludge using aquatic worms, which is said to lead to a reduction in the amount of waste sludge. The aquatic worms used in this process are what are known as free-swimming worms. However, research carried out by the inventors has revealed that no significant reduction in the amount of waste sludge can be achieved using free-swimming worms of the species *Aeolosoma* sp.; that is to say, in a continuously operated biological sewage treatment system, the yield of sludge is not influenced by the occurrence of extremely high volumes of this species of worm.

It has also been proposed in the prior art to use worms from the Tubfficidae family. A drawback of Tubificidae is that they sexually reproduce by means of eggs in a cocoon. This makes the operation of a system comprising Tubificidae less simple and less stable. Experiments have also revealed that Tubificidae have a lower sludge-reduction capacity than *Lumbriculus variegatus*; that is to say, the worm/sludge ratio must be considerably higher.

WO 2005/016833 discloses a method for the treatment of waste water, wherein substances that are insoluble in water are separated from the waste water. These water-insoluble substances are then mixed with organic material, after which this mixture of water-insoluble substances and organic material is transformed with the aid of earthworms, in particular of the species *Lumbricus rubellus, Perionyx excavatus* or *Eisenia foetida*. However, earthworms are terrestrial worms rather than aquatic worms.

EP A 999.194 discloses a method and a plant for the treatment of waste water. Sludge is applied directly from a sludge storage tank to a bed that comprises worms, preferably by means of spraying, a portion of the sludge being converted by the worms into a useful end product and the effluent of the sludge leaving the bed at the bottom. After a period of time, i.e. after six to eighteen months, the beds have to be replaced because they have become saturated with the end product.

Apart from that, there are still further methods disclosed in the prior art for the processing of waste sludge, such as ozonisation, ultrasonic treatment, heat treatment and treatment with an electric field, but these methods require a great deal of energy and do not provide a useful end product.

In the state of the art, there is therefore a need for a method and a plant for the treatment of an aqueous waste stream where considerable amounts of waste sludge are effectively transformed by means of predation and in which a useful end product is formed. A further object of the present invention is the provision of a method and a plant for the treatment of an aqueous waste stream with the aid of a support comprising worms, wherein it is not necessary over the course of time to replace the support comprising worms.

The present invention therefore relates to a method for the treatment of an aqueous waste stream, wherein:
(a) an aqueous waste stream is separated into an effluent and waste sludge; and
(b) the waste sludge is converted into predated waste sludge in a predation reactor, the predation reactor including a support comprising worms and the waste sludge being passed along the support comprising worms.

During the method, waste sludge that is produced during the treatment of waste water is converted into predated waste sludge and additional worms in a predation reactor.

The predation reactor preferably comprises aquatic worms and, in particular, aquatic worms of the species *Lumbriculus variegatus*. Tests have shown that with this species the amount of waste sludge can be reduced by 60% (expressed as dry matter). *Lumbriculus variegatus* also exhibit more stable growth than other worms and reproduce asexually, simplifying the operation.

After transformation of the waste sludge in the predation reactor, a portion of the predated waste sludge and/or effluent, which consists mainly of treated water, can be recirculated to the bioreactor and/or the predation reactor.

The predated waste sludge obtained by the method according to the invention has a granular, compact structure. It has been demonstrated that because of this the predated waste sludge settles more effectively than the non-predated waste sludge. In addition, the predated waste sludge can be dewatered more effectively. This is an important advantage, because dewatering is one of the most relevant sticking points in the processing of waste sludge. As a result of the fact that the predated waste sludge settles more effectively and can be dewatered more easily, it will, if it is for example recirculated to a bioreactor comprising e.g. a membrane separation reactor, cause less contamination of the membranes. This is particularly important in view of the fact that contamination of the membranes is a major problem in the use of a bioreactor in combination with a membrane separation device. After all, if the membranes are highly contaminated, they must be removed and replaced with new membranes or be cleaned and be refitted. During these operations, the membrane separation device can obviously not be in operation. If the predated waste sludge is recirculated to a bioreactor comprising a post-settling device, this will ensure improved settlability of the sludge in the bioreactor, so that the post-settling device operates more effectively.

According to a first advantageous embodiment of the present invention, step (a) is preferably carried out in a bioreactor, the bioreactor preferably comprising a membrane separation device in which step (a) is carried out.

It is also preferable, according to a second embodiment of the present invention, that the predation reactor comprises two compartments that are separated by the support comprising worms, the support preferably comprising a fine-mesh separation device. The waste sludge, in this case, is preferably fed to a first compartment of the predation reactor. Furthermore, water having an oxygen concentration of from 0.1 to 9.0 mg/l, preferably from 2.0 to 7.0 mg/l, is preferably fed to a second compartment of the predation reactor. The worms' mouth opening, with which they ingest the waste sludge, will therefore be in the compartment comprising the waste sludge supplied and their rear, with which they excrete the predated waste sludge and also take in oxygen, in the compartment comprising the oxygen-comprising water.

The predation reactor can be operated at ambient temperature (5-30° C.), preferably between 10 and 25° C.

The present invention also relates to a plant for the treatment of an aqueous waste stream and, more particularly, to a plant for reducing the mass of waste sludge that is produced during the treatment of waste water. According to the invention said plant comprises a predation reactor that comprises a support comprising worms.

According to the invention, the plant preferably also comprises a bioreactor.

According to a first preferred embodiment, the plant comprises a membrane separation device or a post-settling device. If the plant comprises a membrane separation device, said membrane separation device is preferably located in the bioreactor.

Furthermore, according to a second embodiment the predation reactor preferably comprises two compartments that are separated by the support comprising worms, the support preferably comprising a fine-mesh separation device.

According to the invention the predation reactor also preferably comprises aquatic worms, in particular of the species *Lumbriculus variegatus*. A preferred embodiment of the plant according to the invention is shown in FIG. 1.

Figure 1:
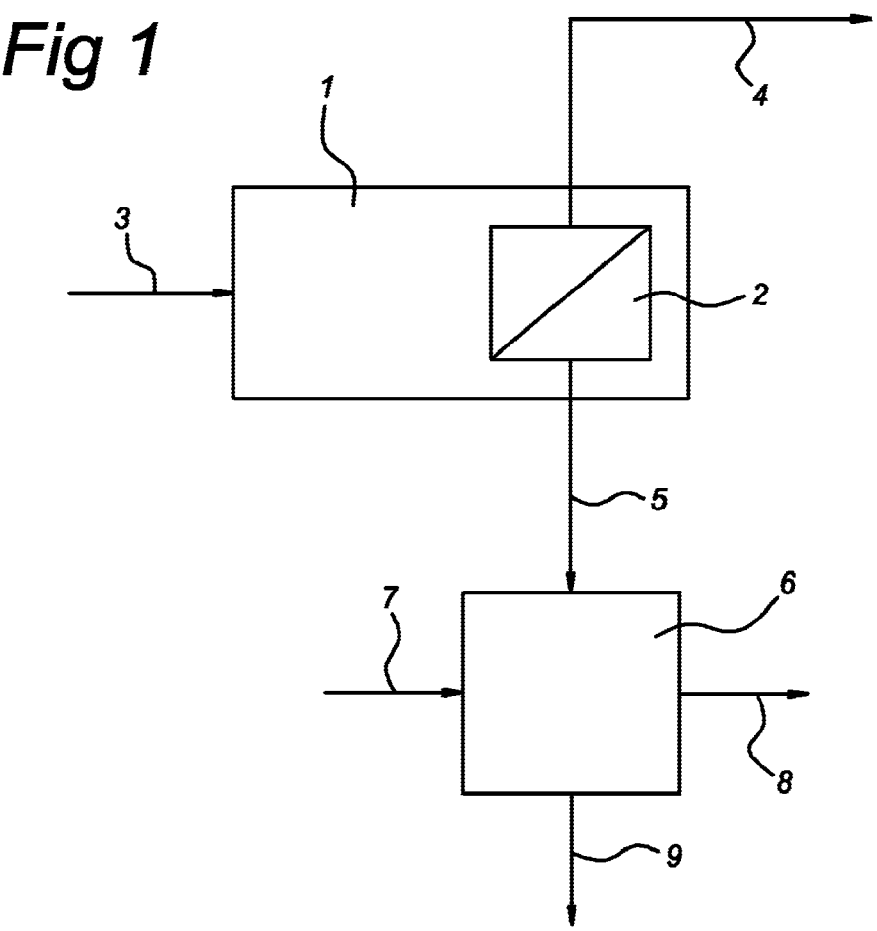
FIG. 1 presents one embodiment of a plant according to the invention.

According to FIG. 1, an aqueous waste water stream (3) is fed to a bioreactor (1) provided with a post-settling device, flotation device or membrane separation device (2). The water that is separated off by the separation device leaves the bioreactor (1) as an aqueous effluent stream (4). The excess sludge that is formed during the biological treatment is fed to a predation reactor (6) as waste sludge (5) and then predated in the predation reactor. In addition to or instead of the waste sludge from the bioreactor, sludge produced during pre-settling of an aqueous waste stream or sludge originating from a fermenter can also be fed to the predation reactor. An oxygen-comprising water stream (7) is also fed to the predation reactor (6), for which purpose aqueous effluent (4) from the bioreactor can optionally be used. This stream leaves the reactor via (8) and is removed or is recirculated, after it has passed through an aerator, as (7) to the predation reactor (6). The predated waste sludge (9) is removed or recirculated to the bioreactor (1). The effluent (8) from the predation reactor is therefore removed or recirculated to the bioreactor (1) or to the predation reactor (6). During the predation of waste sludge, the biomass of the aquatic worms increases. The increase is about 5%-20%, calculated on the basis of the weight of the original amount of waste sludge and expressed in dry matter. The excess mass of worms is harvested and can, for example, appropriately be used in fish food, and as a raw material for agricultural chemicals in adhesives, as a toxicity organism, in compositions comprising surface-active matter, in coatings, in biodegradable plastics, as a source of enzymes, as detergents, as a high-protein additive, or as fertiliser, or is recirculated to the bioreactor (1).

Figure 2:
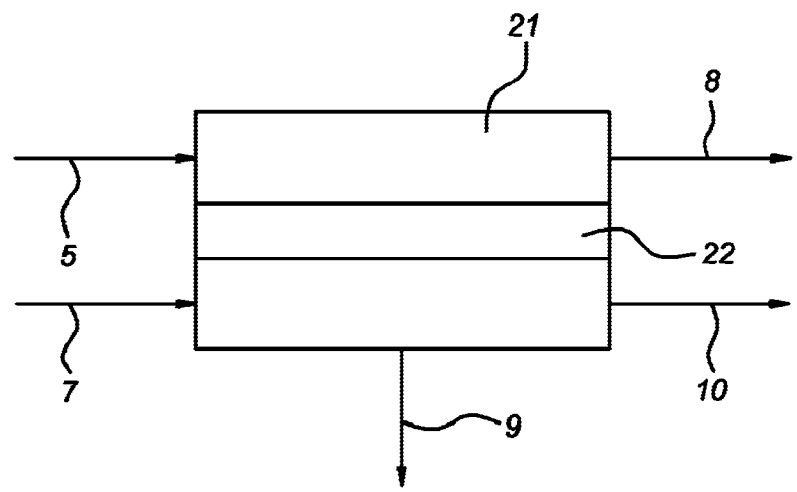
FIG. 2 presents one embodiment of a predation reactor.

FIG. 2 shows a preferred embodiment of a predation reactor. The waste sludge (5) is fed, along with the sessile worms, to the predation reactor (21), which is provided with a support (22) that preferably comprises a fine-mesh separation device, above the support (22). The waste sludge is predated by the worms in the support. The predated waste sludge (9) leaves the predation reactor (21) at the bottom of the support (22) and the effluent comprising non-predated sludge (8) leaves the reactor at the top of the support (22). The support (22) therefore also has a separation function. The oxygen-comprising water (7) is fed to the bottom of the support (22) and also leaves the reactor at the bottom (10) thereof.

EXAMPLES

Figure 3:
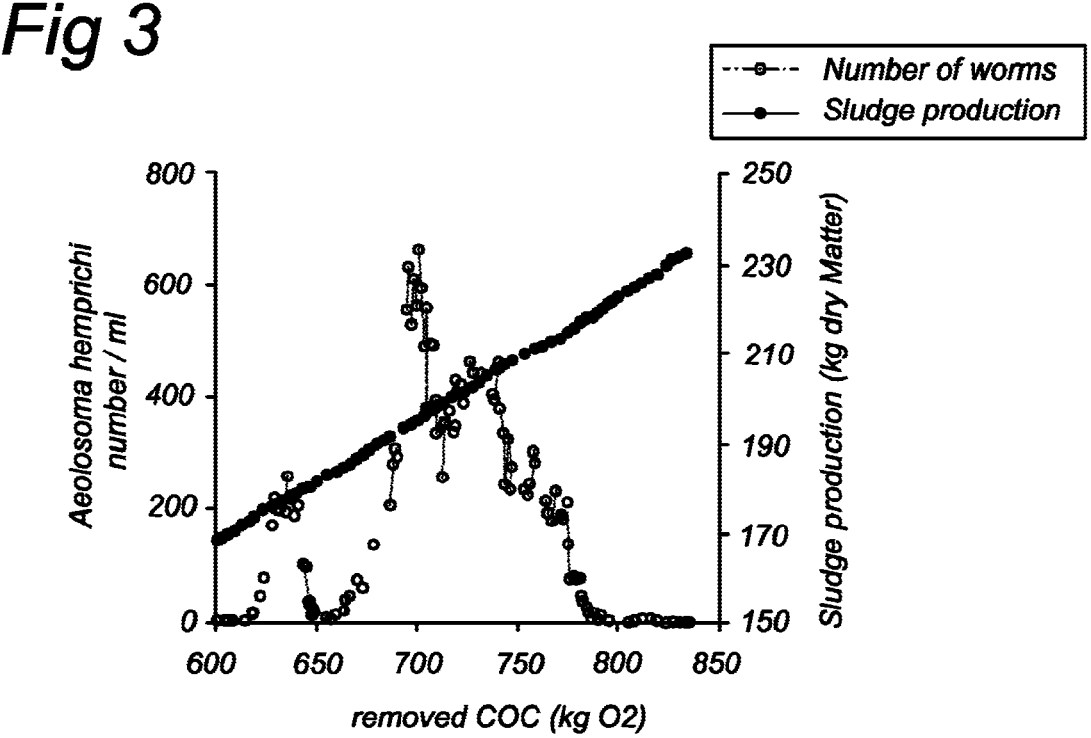
FIG. 3 presents exemplary data showing the quantity of *Aelosoma hemprichi* and the sludge production plotted as a function of the amount of COC that was removed. Open Circles: worm number. Closed Circles: sludge production.

Domestic waste water was metered continuously to a test plant having an aeration volume of 530 litre. During the operation, samples were taken from the waste water and the treated waste water for determining the chemical oxygen consumption (COC) of this waste water. Samples were also taken from the sludge in the plant and from the waste sludge, from which the sludge production was calculated, expressed in dry matter. The number of free-swimming worms in the sludge was also regularly determined. The free-swimming worm *Aelosoma hemprichi* was seen to flourish over a certain period, the quantity of this worm increasing to about 700 per ml of sample. In this period, the quantity of *Aelosoma hemprichi* and the sludge production were then plotted as a function of the amount of COC that was removed in this period. FIG. 3 shows the result The gradient of the line that represents the sludge production as a function of the amount of COC removed does not change or hardly changes during the presence of markedly increased numbers of *Aelosoma hemprichi*. This means that this worm has no effect on sludge production of sludge.

Figure 4:
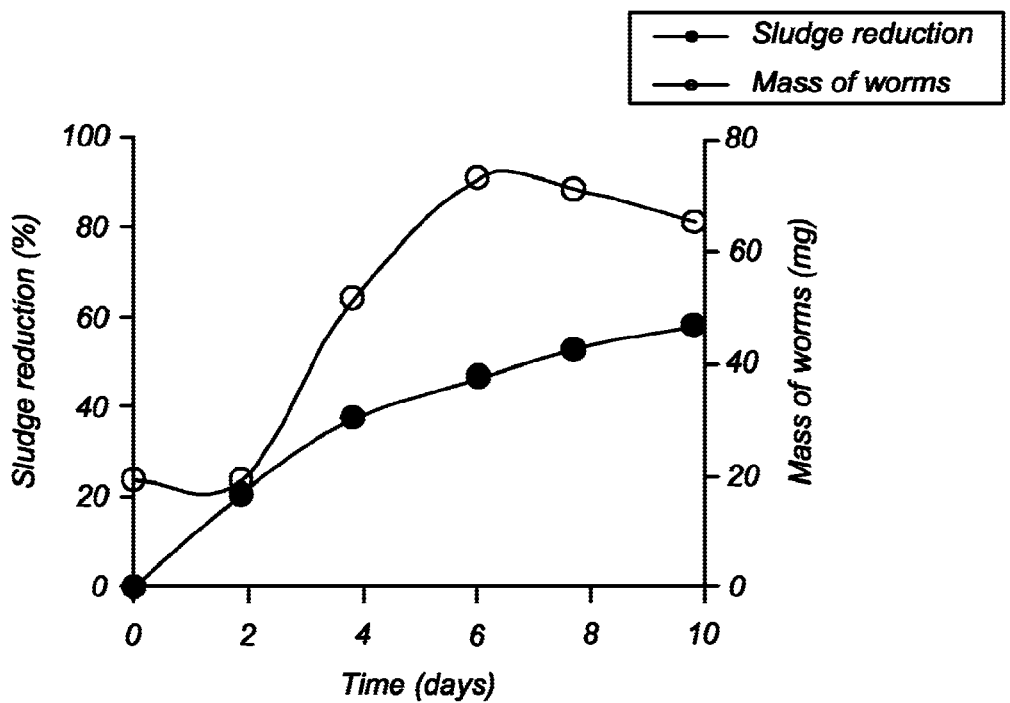
FIG. 4 presents exemplary data showing sludge dry residue and Lumbriculus variegatus dry residue production over time. Open Circles: mass of worms. Closed Circles: sludge reduction.

About 200-300 mg of dry-matter sludge that came from the abovementioned test plant was transferred to Petri dishes. A quantity of worms of the species *Lumbriculus variegatus*, which had previously been bred in a plexiglass trough with effluent and washed out sludge from the test plant as food, was added to this. During the course of the experiments in the Petri dishes, both the dry residue of the sludge and the dry residue of the *Lumbriculus variegatus* were monitored over time. The result is presented in FIG. 4. After about 10 days, the amount of dry matter from the sludge had decreased by almost 60%. This was considerably more than was observed in control experiments without worms. During the experiment, the MORS of worms had increased from about 20 to 65 mg dry matter.

The invention claimed is:
1. A method for the treatment of an aqueous waste stream, wherein:
(a) an aqueous waste stream is separated into an effluent and waste sludge; and

(b) the waste sludge is converted into predated waste sludge in a predation reactor, the predation reactor including a support comprising worms and the waste sludge being passed along the support comprising aquatic worms of the species *Lumbriculus variegatus*, wherein the predated waste sludge is at least 60% lower in volume than the waste sludge.

2. Method according to claim 1, wherein step (a) is carried out in a bioreactor.

3. Method according to claim 2, wherein the bioreactor comprises a membrane separation device and step (a) is carried out in the membrane separation device.

4. Method according to one of the preceding claims, wherein the predation reactor comprises two compartments that are separated by the support comprising worms.

5. Method according to claim 4, wherein the support comprises a fine-mesh separation device.

6. Method according to claim 4, wherein the waste sludge obtained in step (a) is fed to a first compartment of the predation reactor.

7. Method according to claim 4, wherein oxygen-comprising water is fed to a second compartment of the predation reactor.

8. Method according to claim 7, wherein the oxygen concentration in the oxygen-comprising water is 0.1 to 9.0 mg/L.

9. The method of claim 1, further comprising the step of harvesting a worm mass from the support.

10. The method of claim 9, wherein the worm mass comprises a composition selected from the group consisting of a fish food, a binding agent for agricultural chemicals, an adhesive, as a toxicity organism, compositions comprising surface-active matter, in coatings, in biodegradable plastics, as a source of enzymes, as detergents, as a high-protein additive, and as a fertilizer.

* * * * *